April 15, 1930.  A. W. SCHARPF  1,754,575
VULCANIZER
Filed Sept. 10, 1928   2 Sheets-Sheet 1
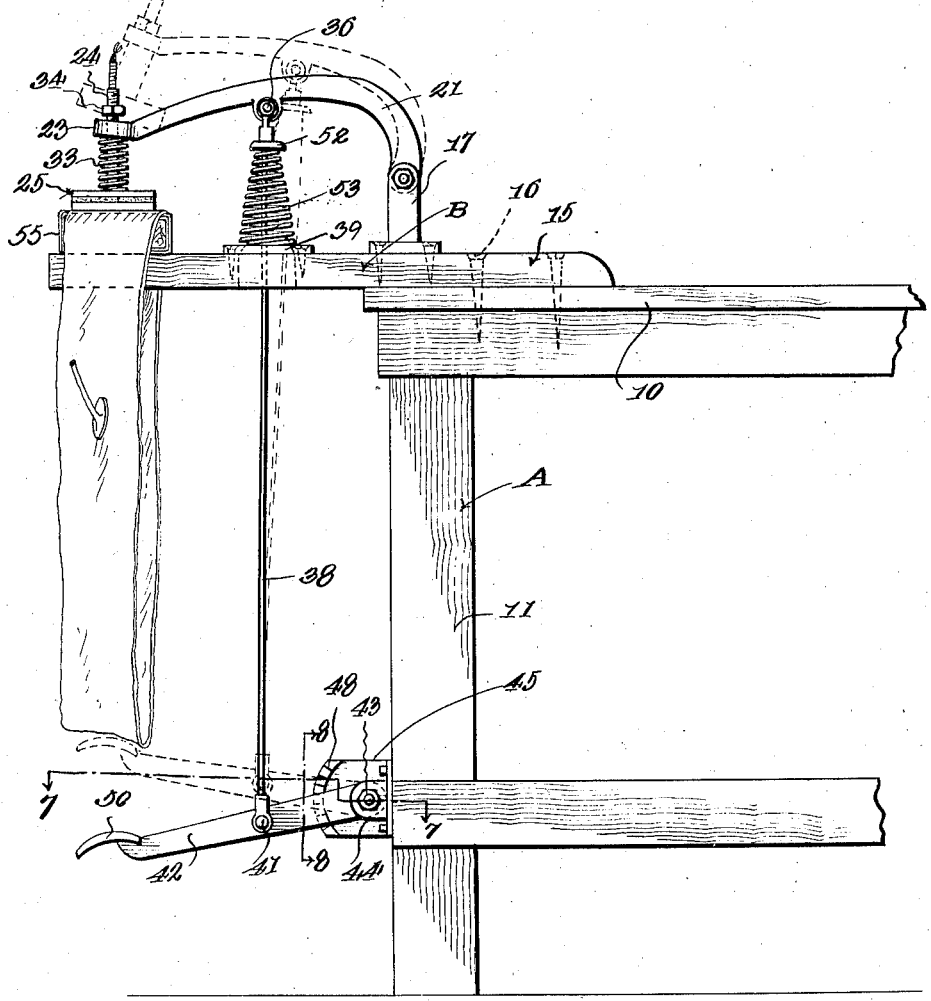

April 15, 1930.  A. W. SCHARPF  1,754,575
VULCANIZER
Filed Sept. 10, 1928   2 Sheets-Sheet 2
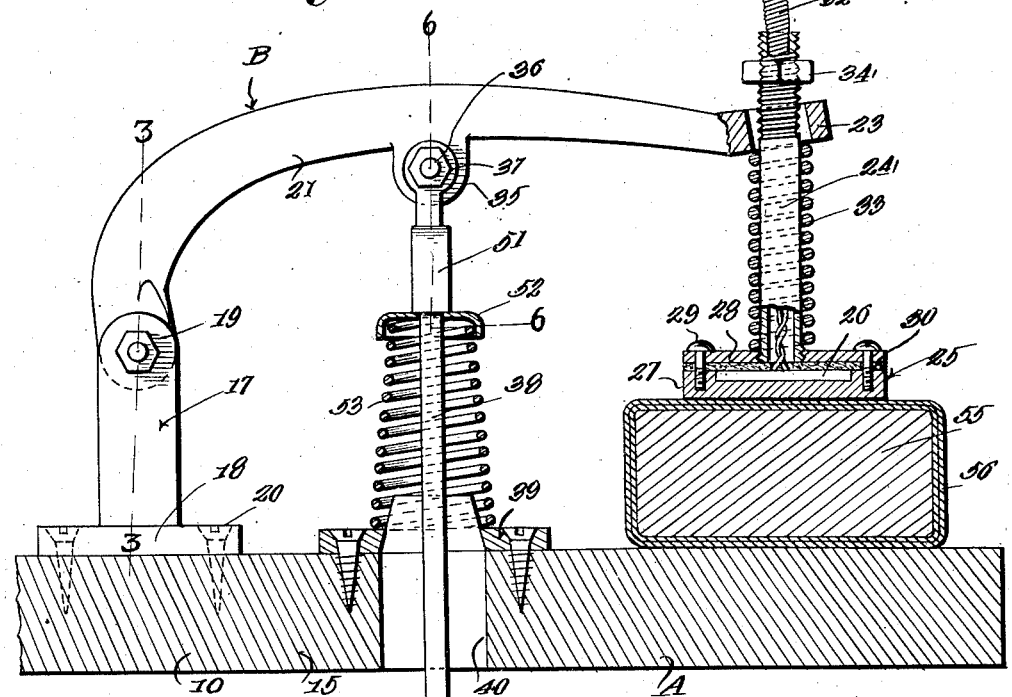
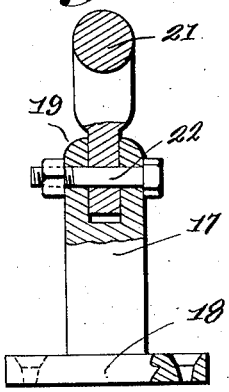
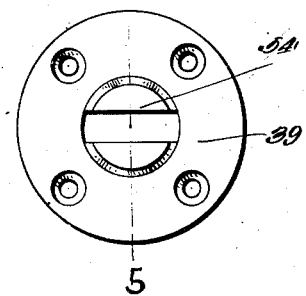
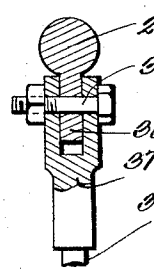
INVENTOR.
Arthur W. Scharpf,
BY
Irving L. McCathran
ATTORNEY.

Patented Apr. 15, 1930

1,754,575

UNITED STATES PATENT OFFICE

ARTHUR W. SCHARPF, OF LA CROSSE, WISCONSIN

VULCANIZER

Application filed September 10, 1928. Serial No. 305,049.

This invention appertains to a novel apparatus for vulcanizing the inner tubes of tires and has for one of its primary objects the provision of novel means for applying pressure to the vulcanizing head whereby an even cure will result and whereby heat and pressure are applied both on the same side of the tube being repaired.

Another important object of the invention is the provision of a novel pressure arm carrying an electrically heated vulcanizing head with novel means for connecting the head and arm together and with novel means for applying pressure to said arm by means of a foot lever pedal.

A further object of the invention is the provision of novel means carried by the pedal or lever for locking the pressure head in any desired position.

A further object of the invention is the provision of novel tire tube vulcanizing device in which a patch can be applied to the inner tube, if desired, in full view of the operator of the machine and held on the inner tube without the necessity of adjusting nuts, bolts, or the like, the head being movable toward the work by the foot pedal.

A still further object of the invention is to provide an improved tire tube vulcanizing device of the above character, which will be durable and efficient in use, one that will be simple and easy to manufacture, and one which can be placed upon the market at a small cost.

With these and other objects in view, the invention will be more fully described, claimed and illustrated in the accompanying drawings, in which drawings:—

Figure 1 is a side elevation of the improved tire inner tube vulcanizing device showing the same connected with a work table or the like.

Figure 2 is an enlarged side elevation of the upper portion of the vulcanizing device looking from the opposite side of Figure 1 and showing parts thereof broken away and in section.

Figure 3 is a vertical section taken on the line 3—3 of Figure 2 illustrating the connection between the pressure arm and the work table bracket.

Figure 4 is a top plan view of the novel connecting rod guide and spring support.

Figure 5 is a diametric section through the same taken on the line 5—5 of Figure 4.

Figure 6 is a vertical section taken on the line 6—6 of Figure 2 illustrating the connection between the pressure arms and the connecting rod.

Figure 7 is a horizontal section taken on the line 7—7 of Figure 1 illustrating the foot pedal or lever and the means for locking said foot pedal lever in place.

Figure 8 is a vertical section taken on the line 8—8 of Figure 1 looking in the direction of the arrows, illustrating the novel lock employed for the foot lever or pedal.

Referring to the drawings in detail, wherein similar reference characters designate corresponding parts throughout the several views, the letter A generally indicates a work bench or table and B my improved tire inner tube vulcanizing device.

The work bench or table A can be of any preferred character as shown and includes a top 10 and supporting legs or standards 11.

My improved vulcanizing device comprises a supporting base block 15 which can be constructed from wood or any other preferred material. As shown this base block 15 is connected to the table top 10 by the use of suitable wood screws 16 and this block projects laterally from one edge of the table top as shown in Figure 1 of the drawings. Secured to the top of the base block 15 intermediate the ends thereof and preferably directly adjacent to the edge of the table top 10 is a supporting bracket or casting 17 which, as shown, includes a circular attaching plate 18 and upstanding bifurcated arm 19. The attaching flange 17 receives the fastening elements 20 for holding the bracket in position on the base block 15. The bifurcated arm 19 receives the inner end of the pressure arm 21 which is preferably of an arcuate configuration and a suitable pivot bolt 22 extends through the upper end of the bifurcated arm 19 and the inner end of the pressure arm 21.

The arcuate arm 21 extends longitudinally of the base block 15 toward the free end thereof and the outer end of the pressure arm 21 is provided with an apertured disc-shaped guide head 23 through which projects the hollow stem 24 of the vulcanizing head 25. This combined vulcanizing and pressure head utilizes an electric heating element 26 so that the device can be attached to any electric light socket and the heating and pressure head 25 is movable toward and away from the work, and an important feature in this class of work. As shown the head 25 embodies a face plate 27 preferably formed of aluminum and a top plate 28 which can be formed of brass. These plates are secured together by suitable fastening elements 29, and the heating element 26 is confined between the same. If desired a suitable sheet or layer of asbestos 30 can be placed between the plates 27 and 28 above the heating element 26. The electric feed wires 31 extend through the hollow stem 24 which is secured directly to the top plate 28 and the stem can also carry a spring guard 32 for the feed wires 31.

An expansion spring 33 is placed around the stem 34 between the combined pressure and heating head 25 and the apertured head 23 of the arm 21, and a nut 34 is threaded on the stem and run down on the stem until the spring is placed under considerable compression and the stem is vertically adjusted to bring the combined pressure and heating head 25 at about the proper height.

The pressure arm 21 at a point intermediate its ends is provided with a depending pivot ear 35 to which is pivotally connected by means of a bolt 36 the upper bifurcated end 37 of a connecting rod 38. This connecting rod 38 extends through a guide collar 39 and an opening 40 formed in the base block 15.

The connecting rod 38 extends a considerable distance below the base block 15 and is pivotally secured by means of a bolt 41 to a foot pedal or lever 42 intermediate the ends thereof. The inner end of the foot pedal or lever 42 is pivotally secured by means of a bolt 43 between a pair of ears 44 and 45 formed on a casting 46 which is connected by suitable fastening elements 47 to one of the legs 11 of the table or bench A. As shown the ear 45 is of a greater size than the ear 44 and is provided with an arcuate segment rack 48, any one of the teeth of which are adapted to be engaged by a dog 49 formed on the foot pedal or lever 42. The outer end of the lever can be provided with any desired type of pedal 50.

Again referring to the connecting rod 38, it is to be noted that the same is enlarged adjacent to its upper end, as at 51 and fitted against the enlargement is a cup washer 52 which receives the upper end of a helical spring 53 which is placed about the connecting rod 38. The lower end of this helical spring 53 engages the guide plate 39, which is provided with a slotted boss 54 which acts as means for receiving the lower end of the spring. This spring 53 normally functions to hold the pressure arm 21 and the pedal in a raised position and the combined pressure and heating head 25 above the work.

In use of the improved device, when an inner tube is to be vulcanized a work block 55 preferably formed of wood is placed on the base block 15 and this work block can be provided with several plies 56 of cushioning material, such as the rubber of old inner tubes.

The inner tube to be repaired is then placed on the work block as shown in Figure 1 of the drawings and after the tube has been treated in the desired way, current is turned on in the heating element 26 and after the head has become sufficiently heated pressure is applied to the foot pedal 42 which brings the combined pressure and heating head into engagement with the work at the desired point. Movement of the pressure arm 21 compresses the spring 33 which forces the combined pressure and heating head in firm contact with the work and the tooth or dog 49 engaging the adjacent tooth of the segmental rack 48 will hold the head in an adjusted position under tension in contact with the work. The head can then be left in this position until the desired length of time has elapsed for the curing of the rubber after which the lever 42 can be moved sideways until the tooth 49 is moved out of engagement with the adjacent tooth of the segmental rack 48 and the spring 53 will function to lift the arm 21 and consequently the combined pressure and heating head 25 from out of engagement with the inner tube. The tube can now be removed and will be found ready for work.

From the foregoing description, it can be seen that I have provided a novel inner tube vulcanizing device which can be actuated without manipulation of any screws, bolts or the like and which will permit the quick and efficient vulcanizing of the tube of any size or character.

Changes in detail may be made without departing from the spirit or the scope of this invention, but:—

What I claim as new is:

1. In a device for vulcanizing inner tubes, a work bench, a base block secured to and projecting laterally from the bench, an arcuate pressure arm rockably secured at its inner end to said block, a combined pressure and heating head resiliently carried by the outer end of said pressure arm, means for swinging the arm on the block and the head toward and away from the tube to be vulcanized including a pivoted foot lever secured to said bench, a connecting rod operatively connecting said pressure arm to the pedal, resilient means for normally holding the pedal and the pressure arm in a raised position, and means for holding the foot lever in a locked adjusted position against movement.

2. In a device for vulcanizing inner tubes, a support for the object to be vulcanized, an arcuate pressure arm rockably secured at its inner end to said support and extending over the same, a combined pressure and heating head resiliently carried by the outer end of said pressure arm, the support being provided with a guide intermediate the end of the pressure arm, an operating link pivotally carried by the pressure arm intermediate its end and between the pressure head and the pivot point of the arm, an expansion spring coiled about said link between the pressure arm and the support for normally holding the pressure arm in a raised position, and means for operating the link.

In testimony whereof I affix my signature.

ARTHUR W. SCHARPF.